United States Patent
Millis et al.

(10) Patent No.: US 10,569,690 B2
(45) Date of Patent: Feb. 25, 2020

(54) PIVOTING FURNITURE

(71) Applicant: Winnebago Industries, Inc., Forest City, IA (US)

(72) Inventors: John Millis, Junction City, OR (US); Jason Groshong, Forest City, IA (US); Michael Berns, Garner, IA (US)

(73) Assignee: Winnebago Industries, Inc., Forest City, IA (US)

( * ) Notice: Subject to any disclaimer, the term of this patent is extended or adjusted under 35 U.S.C. 154(b) by 9 days.

(21) Appl. No.: 15/847,143

(22) Filed: Dec. 19, 2017

(65) Prior Publication Data

US 2018/0170235 A1    Jun. 21, 2018

Related U.S. Application Data

(60) Provisional application No. 62/436,212, filed on Dec. 19, 2016.

(51) Int. Cl.
| | |
|---|---|
| *B60P 3/36* | (2006.01) |
| *B60P 3/34* | (2006.01) |
| *A47L 17/02* | (2006.01) |
| *A47B 46/00* | (2006.01) |
| *A47B 31/06* | (2006.01) |
| *A47B 77/00* | (2006.01) |
| *A47B 33/00* | (2006.01) |

(52) U.S. Cl.
CPC ............... *B60P 3/36* (2013.01); *A47B 31/06* (2013.01); *A47B 46/00* (2013.01); *A47L 17/02* (2013.01); *B60P 3/34* (2013.01); *A47B 33/00* (2013.01); *A47B 77/00* (2013.01)

(58) Field of Classification Search
CPC ..................................... B60P 3/36; B60P 3/34
USPC ......................................................... 296/156
See application file for complete search history.

(56) References Cited

U.S. PATENT DOCUMENTS

| | | | |
|---|---|---|---|
| 6,053,551 A * | 4/2000 | Blondeau ................. | B60P 3/34 296/172 |
| 6,098,346 A | 8/2000 | Miller et al. | |
| 7,039,968 B1 | 5/2006 | Warmoth | |
| 7,204,536 B2 * | 4/2007 | Kunz ........................ | B60P 3/34 296/26.01 |
| 7,828,377 B2 | 11/2010 | Grace | |
| 2006/0016372 A1 | 1/2006 | Younse | |
| 2006/0192468 A1 | 8/2006 | Gardner | |
| 2007/0235096 A1 | 10/2007 | Nielsen | |
| 2009/0236001 A1 | 9/2009 | Damaske et al. | |
| 2016/0325671 A1 * | 11/2016 | White ...................... | B60P 3/36 |

* cited by examiner

*Primary Examiner* — Joseph D. Pape
*Assistant Examiner* — Dana D Ivey
(74) *Attorney, Agent, or Firm* — Faegre Baker Daniels LLP

(57) ABSTRACT

A rotatable galley includes a frame laterally rotatable between a first position and a second position, a pivot coupled to the frame such that the frame is rotatable with respect to the pivot, and a first linear actuator coupled between the frame and the pivot. The first linear actuator can be configured to extend to rotate the frame to the first position and retract to rotate the frame to the second position.

19 Claims, 7 Drawing Sheets

PIVOTING FURNITURE

RELATED APPLICATION

This application claims priority to Provisional Application No. 62/436,212, filed Dec. 19, 2016, which is herein incorporated by reference in its entirety.

SUMMARY

In certain embodiments, a recreational vehicle includes a floor with a hole and extending along a plane and a galley, which includes a frame and a pivot. The frame is positioned above the floor and is rotatable between a first position and a second position around an axis perpendicular to the plane. The pivot is coupled to the frame, partially positioned above the floor, partially positioned below the floor, and extends through the hole in the floor. The frame is rotatable with respect to the pivot.

In certain embodiments, a rotatable galley includes a frame laterally rotatable between a first position and a second position, a pivot coupled to the frame such that the frame is rotatable with respect to the pivot, and a first linear actuator coupled between the frame and the pivot. The first linear actuator can be configured to extend to rotate the frame to the first position and retract to rotate the frame to the second position.

In certain embodiments, a furniture system includes a furniture assembly, which includes a frame rotatable between the first position and the second position, a central pivot assembly coupled to the frame, and means for rotating the frame between the first position and the second position.

DETAILED DESCRIPTION

The present disclosure relates to apparatuses, systems, and methods for providing pivoting furniture assemblies, such as galleys. The galleys discussed throughout the disclosure are just one example of the types of furniture that can be constructed to pivot. Other types of furniture can utilize aspects of the present disclosure to enable pivoting.

Figure 1:
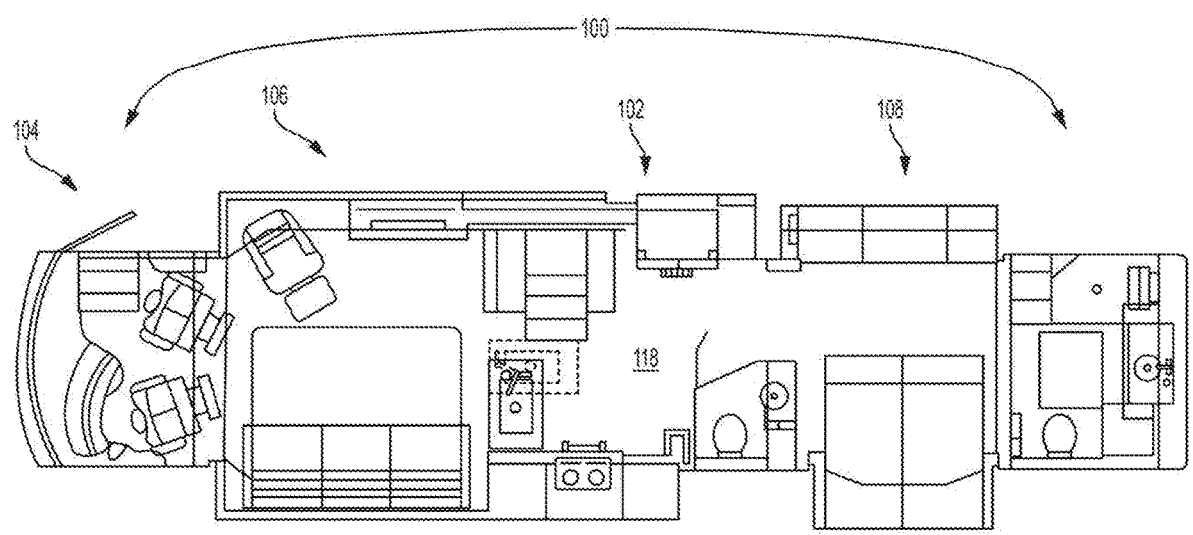
FIG. 1 shows a top view of a cabin of a recreational vehicle, in accordance with certain embodiments of the present disclosure.
Figure 2:
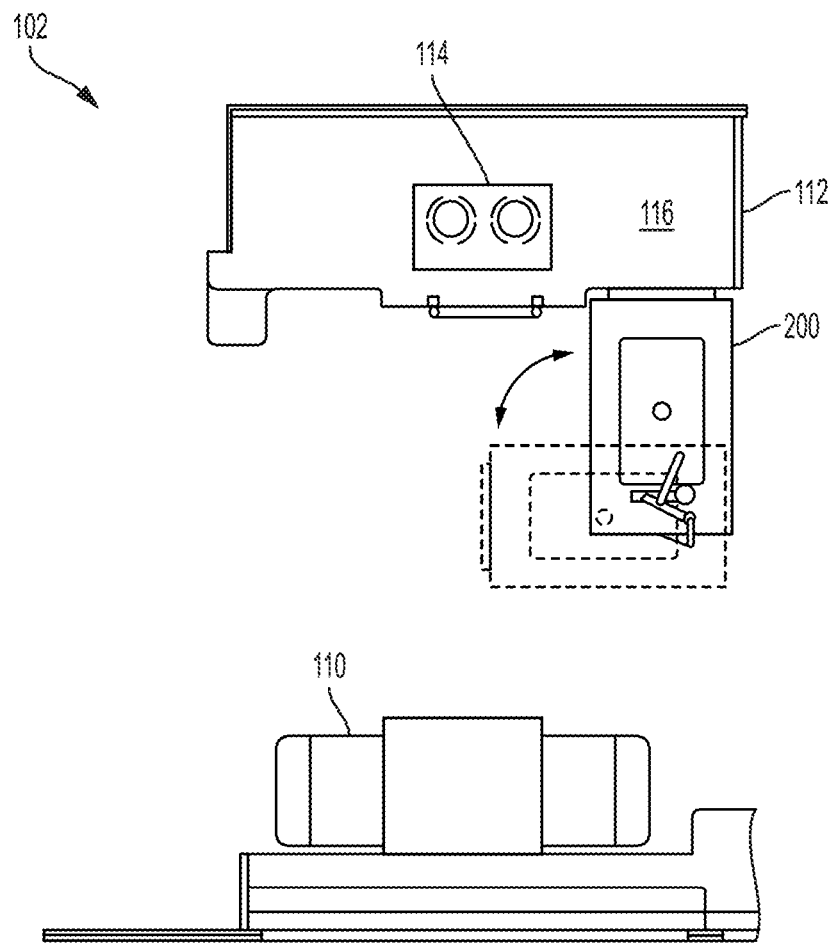
FIG. 2 shows a top view of furniture, in accordance with certain embodiments of the present disclosure.

FIG. 1 shows a top view of a cabin 100 of a recreational vehicle. The cabin 100 includes a kitchen area 102, a cab area 104, a living room area 106, and a bedroom area 108. FIG. 2 shows a top view of the kitchen area 102 featuring a table 110 and a food preparation section 112, which includes a stovetop 114 and a countertop 116. The cabin 100 further includes a floor 118 that extends throughout the cabin 100.

Figure 3:
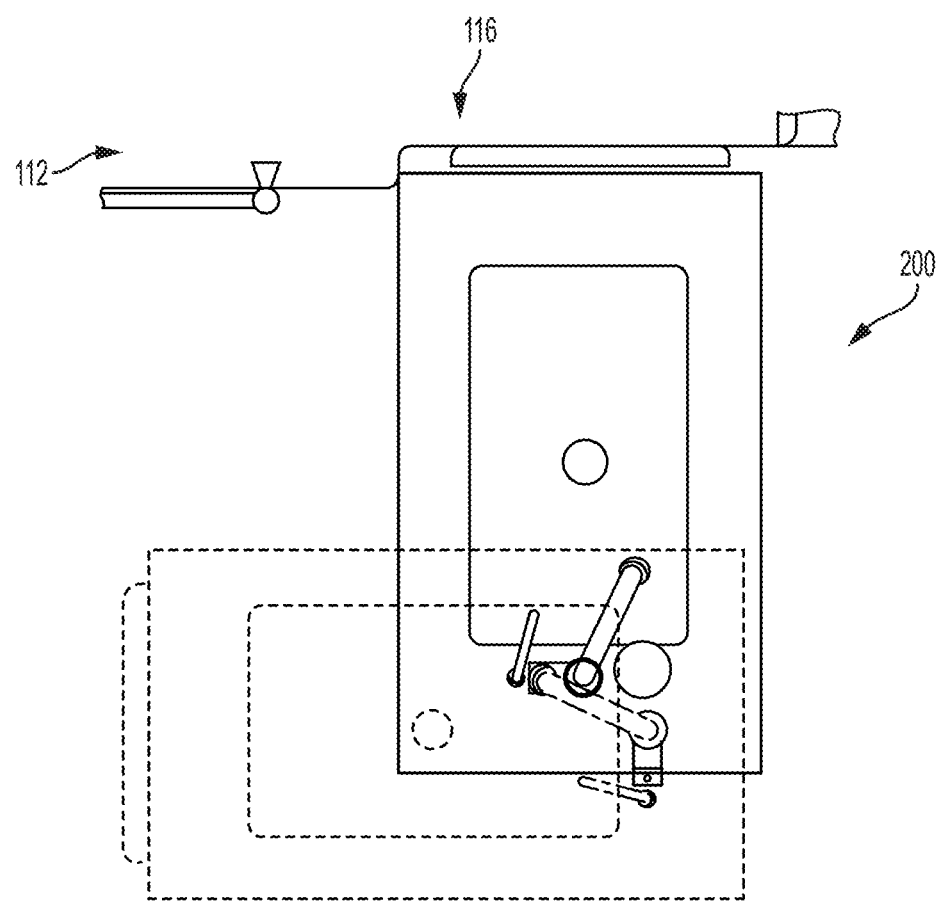
FIG. 3 shows a top view of a galley, in accordance with certain embodiments of the present disclosure.

The kitchen area 102 also includes a galley 200 configured and arranged to rotate between two or more positions. FIG. 2 shows the galley 200 at two different positions. In dotted lines, the galley 200 is shown in an island position, and, in solid lines, the galley 200 is rotated approximately 90 degrees from the island position as noted by the arrow in FIG. 2. FIG. 3 shows a zoomed-in view of the galley 200 at the two different positions.

Figure 4A:
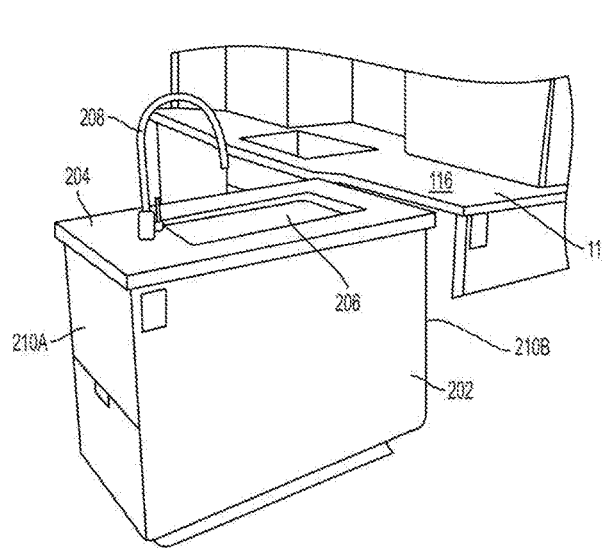
FIGS. 4A, 4B, and 5 show perspective views of the galley of FIG. 3.
Figure 4B:
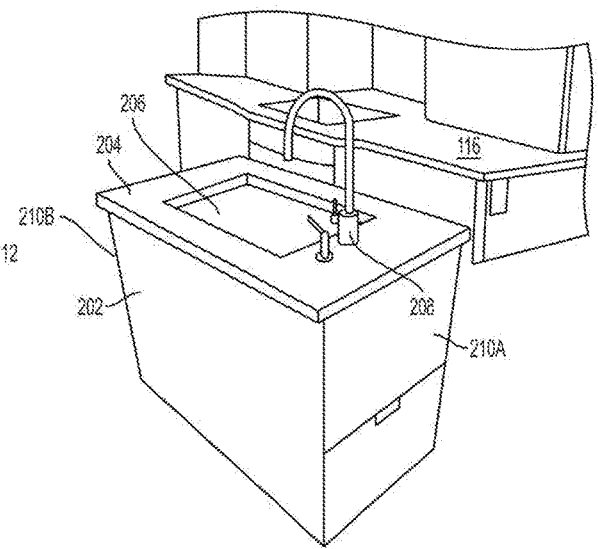

As shown in FIGS. 4A-4B, the galley 200 includes a body 202, a countertop 204, a sink 206, and a faucet 208. As shown in FIGS. 3 and 4A, the galley 200 is positioned with respect to the food preparation section 112 such that little space exists between the galley 200 (e.g., the countertop 204) and the food preparation section 112 (e.g., the countertop 116). In this position, the galley 200 and the food preparation section 112 form an L-shaped configuration.

FIG. 4B shows the galley 200 at the island position such that the galley is rotated approximately 90 degrees from the position shown in FIGS. 3 and 4A. In the island position, the galley 200 is positioned with respect to the food preparation section 112 such that someone is able to walk between the galley 200 and the food preparation section 112.

Figure 5:
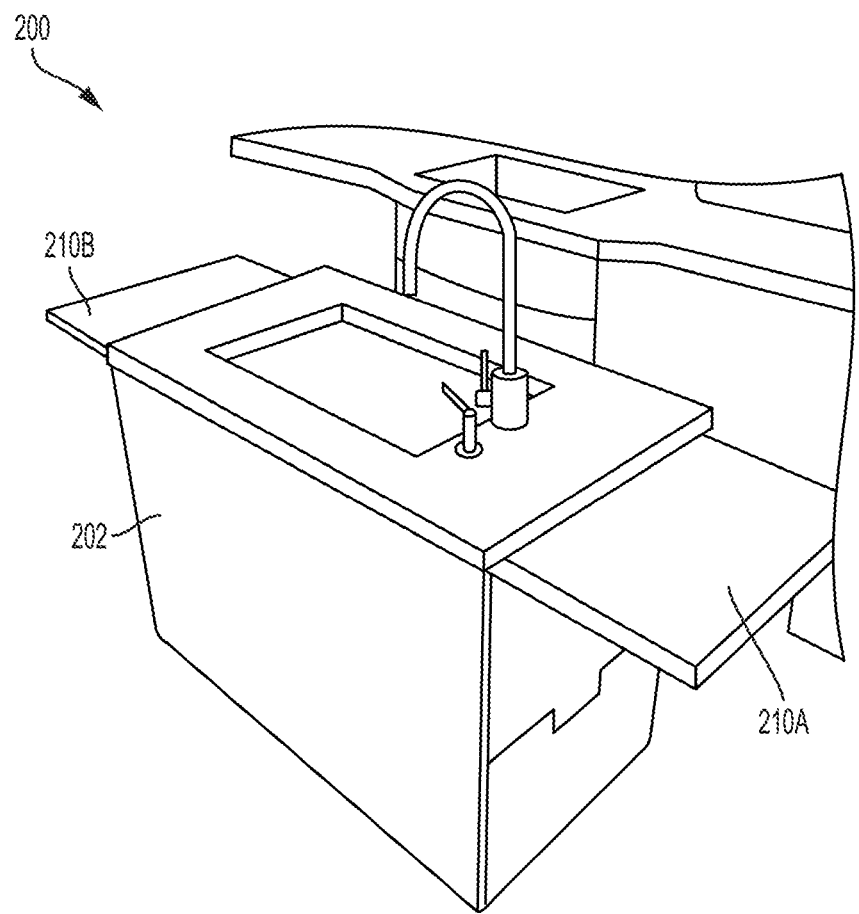
Figure 6:
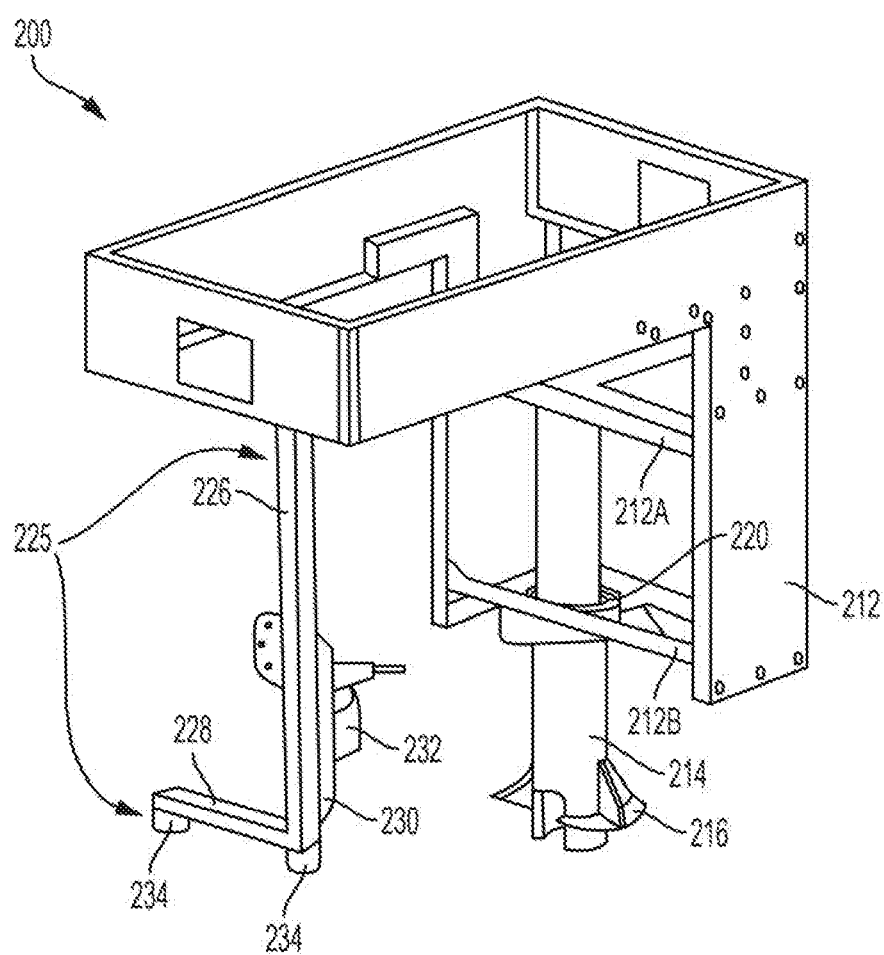
FIG. 6 shows a perspective view of a frame and a pivot, in accordance with certain embodiments of the present disclosure.

FIG. 5 shows the galley 200 further including a first extender 210A and a second extender 210B positioned on opposite sides of the galley 200. The first extender 210A and the second extender 210B can be rotated from a stored position, like that shown in FIG. 4B, and an extended position, like that shown in FIG. 5.

FIGS. 6 and 7A-7D show the galley 200 without the body 202, the countertop 204, the sink 206, and the faucet 208. As shown in FIGS. 6 and 7A-7D, the galley 200 includes a frame 212 and a pivot 214 coupled to each other. The frame 212 is configured and arranged to rotate around the pivot 214, which can comprise a hollow tube that is cylindrical shaped. The pivot 214 provides a conduit for electrical lines and plumbing to extend through, such that the galley 200 is coupled in electric and fluid communication with respective electric and water systems of the recreational vehicle. In certain embodiments, the electrical lines and the plumbing comprise flexible materials that are long enough such that the galley 200 can rotate between positions without the electrical lines and the plumbing decoupling from the galley 200 and/or electric and water systems. In certain embodiments, for waste water, the plumbing includes fittings that permit rotation without compromising seals of the plumbing.

In certain embodiments, the pivot 214 also is coupled to the floor 118 of the cabin 100 to at least partially support the galley 200 (and the frame 212). As such, in certain embodiments, the pivot 214 does not rotate (e.g., is stationary) with respect to the floor 118. In other embodiments, the pivot 214 is coupled to a frame of the recreational vehicle and extends through a hole in the floor 118. The pivot 214 can include one or more flanges 216 to provide structure to fasten or weld the pivot 214 to the floor 118 and/or the frame of the recreational vehicle. The galley's frame 212 can include one or more openings 218 for the pivot 214 to extend through.

The galley 200 can include one or more bearing plates 220 that support the frame 212 and provide smooth rotation of the frame 212 with respect to the pivot 214. In certain embodiments, the frame 212 at least partially rests on the one or more bearing plates 220, which in turn rests on the pivot 214. The one or more bearing plates 220 can also help couple the frame 212 to the pivot 214 and keep the frame 212 from tipping during rotation of the frame 212 between positions. For example, one of the bearing plates 220 can couple the pivot 214 at an upper portion 212A of the frame 212, and another of the bearing plates 220 can couple the pivot 214 at a lower portion 212B of the frame 212. This arrangement can assist with mitigating tipping. In certain embodiments, the one or more bearing plates 220 are positioned between the frame 212 and the pivot 214 such that the frame 212 is indirectly coupled to the pivot 214 at certain points along the pivot 214.

The galley 200 can include at least one actuator 222, which extends and retracts to rotate the frame 212 (and therefore the galley 200) between positions. The actuator 222 can be extended and retracted via electrical power (e.g., via a solenoid 224) in response to a toggle or rocker switch, for example. In certain embodiments, the actuator 222 includes other mechanisms to extend and retract (e.g., air, hydraulics). The toggle switch can be switched between two positions such that the toggle switch causes the galley 200 to rotate between the island position and the L-shape position (e.g., approximately 90 degrees from the island position). The toggle switch can be positioned on the galley 200 or elsewhere in the cabin 100.

Figure 7A:
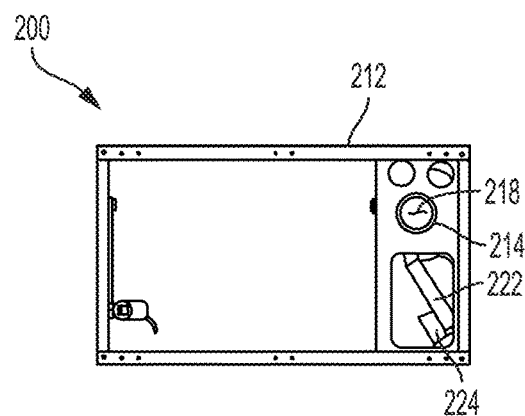
FIG. 7A shows a top view of the frame and the pivot of FIG. 6.
Figure 7B:
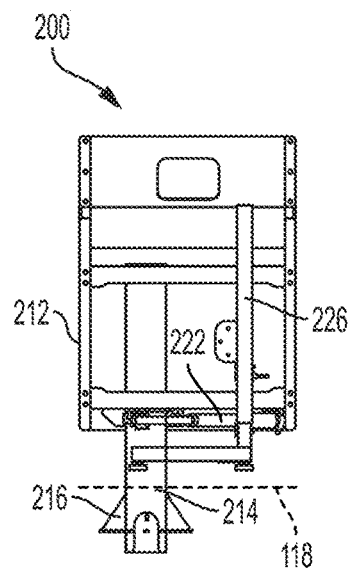
FIGS. 7B-7D show side views of the frame and the pivot of FIG. 6.

The actuator 222 is shown in FIGS. 7A-7B as being coupled between the frame 212 and the pivot 214 and mounted such that the actuator 222 extends and retracts in a substantially horizontal direction. For example, one end of the actuator 222 can be directly coupled to the frame 212 and the other end of the actuator 222 can be directly coupled to the pivot 214. Although the actuator 222 is shown as being positioned near the bottom of the frame 212 (e.g., the lower portion 212B), the actuator 222 can be positioned elsewhere between the frame 212 and the pivot 214. In the embodiment shown in the Figures, the galley 200 is positioned in the island position when the actuator 222 is extended and is positioned in the L-shape position (e.g., approximately 90 degrees from the island position) when the actuator 222 is retracted—although other actuator positions are within the scope of the present disclosure. In certain embodiments, the pivot 214 can include one or more stops fastened or welded to the pivot 214. The stops assist with keeping the galley 200 from rotating beyond the island position and/or the L-shape position. The stops can be positioned such that portions of the frame 212 would contact the stops if the galley rotates beyond the desired positions.

To keep the frame 212 (and therefore the galley 200) from undesirably rotating between positions, in certain embodiments, the actuator 222 includes a brake (e.g., built-in brake) that is activated when the actuator 222 is in an extended position and/or a retracted position. For example, when the actuator 222 is in its retracted position and the galley is therefore in the L-shape position, the actuator's brake can be used to maintain the position. In certain embodiments, the galley 200 includes other mechanisms (e.g., manual brakes) that can be used to keep the frame 212 from undesirably rotating.

Although the embodiments described above contemplate a linear actuator, the galley 200 could include a rotational actuator that rotates the frame 212 (and therefore the galley 200) between the island position and the L-shape position. The rotational actuator could be positioned concentric with the pivot 214 and coupled to the pivot 214 and the frame 212 to permit rotation of the frame 212 with respect to the pivot 214.

The galley 200 is supported by the pivot 214 on one end and by a support assembly 225 on the other end. The support assembly 225 includes at least one leg 226, an extending support 228, an actuator 230, a solenoid 232, and at least one foot 234. When the galley 200 is in the island position and the L-shape position, the support assembly 225 is configured to be in a support position. For example, portions of the support assembly 225 (e.g., at least one foot 234) can rest on the floor 118 of the recreational vehicle and support the frame 212. When the galley 200 is about to or is rotating between positions, the support assembly 225 is configured to be in a rotation position. For example, the support assembly 225 can move to a position such that no portions of the support assembly 225 contact the floor 118 of the recreational vehicle. More particularly, portions of the support assembly 225 can retract into the galley 200 so that there is a gap between the support assembly 225 (e.g., at least one foot 234) and the floor 118.

Figure 7C:
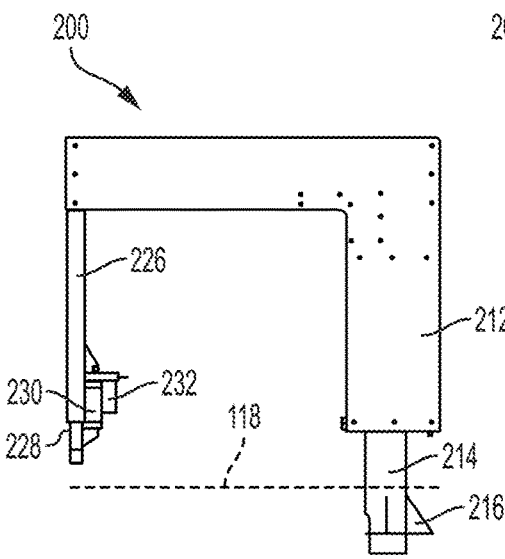
Figure 7D:
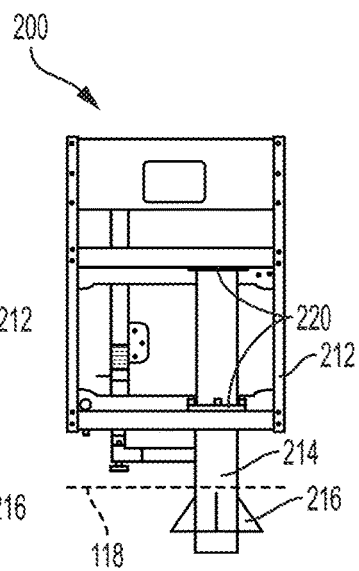

FIGS. 7B-7C show the leg 226 of the support assembly 225 coupled to and extending from the frame 212. The extending support 228 is coupled to the leg 226 and is able to be moved between a retracted position and an extended position with respect to the leg 226. In certain embodiments, the extending support 228 is at least partially positioned within the leg 226 (e.g., in a telescoping fashion) such that the extending support 228 can move between positions. The actuator 230 is coupled to the leg 226 and the extending support 228 and helps move the extending support 228 between the retracted position and an extended position. For example, the actuator 230 can be a linear actuator that can be extended and retracted via electrical power (e.g., via the solenoid 232) in response to the toggle or rocker switch. As shown in FIGS. 7B-7C, the actuator 230 can be positioned to extend and retract along a axis perpendicular to the floor 118 of the recreational vehicle.

When the actuator 230 (and therefore the extending support 228) is extended, the at least one foot 234 contacts the floor 118 of the recreational vehicle to support the galley 200. When the actuator 230 (and therefore the extending support 228) is retracted, there is a gap between the at least one foot 234 and the floor 118 to allow the galley 200 to rotate between positions without damaging (e.g., creating marks, divots) the floor 118. In certain embodiments, the actuator 230 is configured to retract when the toggle switch (or other controlling mechanism) is switched to a different position to cause the galley 200 to rotate to another position. Once the galley 200 has reached the new position, the actuator 230 can extend to provide support for the galley 200. In certain embodiments, separate toggle switches are used to control the actuator 230 of the support assembly 225 and the actuator 222 used to rotate the galley 200. In some embodiments, activation of the actuator 222 is predicated on confirmation that the actuator 230 is in a retracted state. Although the embodiments described above contemplate no contact between the support assembly 225 and the floor 118 during rotation of the galley 200, the support assembly 225 could include a device (e.g., a roller, wheel, and the like) that allows the galley 200 to be rotated without damaging the floor 118.

To keep the extending support 228 from undesirably moving between positions, in certain embodiments, the actuator 230 includes a brake (e.g., built-in brake) that is activated when the actuator 230 is in an extended position and/or a retracted position. For example, when the actuator 230 is in its extended position, the actuator's brake can be used to maintain the position.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A recreational vehicle comprising:
a floor extending along a plane; and
a galley including:
a frame positioned above the floor and rotatable with respect to the floor between a first position and a second position around an axis perpendicular to the plane,
a pivot coupled to the frame, partially positioned above the floor, partially positioned below the floor, and extending through the floor, wherein the frame is rotatable with respect to the pivot, and
a linear actuator coupled to the frame and configured to extend and retract to rotate the frame between the first position and the second position.

2. The recreational vehicle of claim 1, wherein the pivot is stationary.

3. The recreational vehicle of claim 1, wherein the linear actuator is configured to extend and retract along a plane parallel to the floor.

4. The recreational vehicle of claim 1, wherein the first position and the second position are substantially ninety degrees from each other.

5. The recreational vehicle of claim 1, wherein the galley includes:
a body coupled to the frame,
a countertop coupled to the body or the frame,
a sink coupled to the countertop, and
a faucet coupled to the countertop.

6. The recreational vehicle of claim 1, wherein the pivot is a hollow cylinder.

7. The recreational vehicle of claim 1, wherein the frame is coupled to the pivot via a bearing plate.

8. The recreational vehicle of claim 1, wherein the frame includes a leg portion including an extending member that is configured to move between a rotation position and a stationary position.

9. The recreational vehicle of claim 8, wherein the linear actuator is a first linear actuator, the recreational vehicle further comprising a second linear actuator coupled to the leg portion and configured to actuate the extending member between the rotation position and the stationary position.

10. The recreational vehicle of claim 1, wherein the linear actuator is extended and retracted via electrical power.

11. A rotatable galley comprising:
a frame laterally rotatable between a first position and a second position;
a body coupled to the frame;
a countertop coupled to the body or the frame;
a sink coupled to the countertop;
a faucet coupled to the countertop;
a pivot coupled to the frame such that the frame is rotatable with respect to the pivot; and
a first linear actuator coupled between the frame and the pivot and configured to extend to rotate the frame to the first position and retract to rotate the frame to the second position.

12. The galley of claim 11, further comprising:
a bearing plate coupled between the frame and the pivot.

13. The galley of claim 11, wherein the frame includes a support assembly including an extending member that is configured to move between a rotation position and a stationary position.

14. The galley of claim 13, further comprising:
a second linear actuator coupled to the extending member and configured to actuate the extending member between the rotation position and the stationary position.

15. The galley of claim 14, wherein the support assembly includes a leg that is coupled to the extending member, wherein the extending member is at least partially positioned within the leg.

16. The galley of claim 15, wherein the second linear actuator is coupled between the extending member and the leg.

17. The galley of claim 11, wherein the pivot is positioned within a periphery of the frame.

18. A furniture system comprising:
a furniture assembly including:
a frame including a support assembly and rotatable between a first position and a second position,
a central pivot assembly coupled to the frame,
a first linear actuator for rotating the frame between the first position and the second position, and
a second linear actuator for extending and retracting at least a portion of the support assembly.

19. The furniture system of claim 18, wherein the first position and the second position are substantially ninety degrees from each other.

* * * * *